Dec. 1, 1925.

A. H. WOLFF 1,563,607

DIAPHRAGM PRESSURE REGULATOR FOR GAS HEATERS

Filed Feb. 6, 1924

Aaron H. Wolff  INVENTOR

ATTORNEY.

Patented Dec. 1, 1925.

1,563,607

UNITED STATES PATENT OFFICE.

AARON H. WOLFF, OF NEW YORK, N. Y.

DIAPHRAGM PRESSURE REGULATOR FOR GAS HEATERS.

Application filed February 6, 1924. Serial No. 691,081.

*To all whom it may concern:*

Be it known that I, AARON H. WOLFF, a citizen of the United States, residing at the borough of Manhattan, in the city, county, and State of New York, have invented certain new and useful Improvements in Diaphragm Pressure Regulators for Gas Heaters, of which the following is a specification, reference being had therein to the accompanying drawings, which form a part thereof.

My invention relates to diaphragm pressure regulators for gas heaters, and more particularly to a regulator of this type adapted for use in isolated domestic heating units in which gas is used to bring water in a boiler to the desired temperature to permit the heater to be used either for hot water, or steam, heating.

In such heater units it has long been the practice to provide a pressure regulator actuated by pressure conditions in the boiler for controlling the gas supply, such regulators including a casing having two distinct chambers each closed by a flexible diaphragm. One of these chambers was placed in communication with the upper portion of the boiler so that the diaphragm closing same, would be affected by changing pressure conditions in the boiler, and the other chamber was in communication with the source of gas supply, the diaphragm closing this chamber being acted upon by the diaphragm closing the chamber in communication with the boiler, so that an increased pressure resulting in the flexure of the last named diaphragm would cause a corresponding flexure of the diaphragm closing the chamber in communication with the source of gas in a manner to effectively interrupt the main flow of gas and leave only a by-pass open, for the purpose of furnishing sufficient gas to keep a pilot light burning.

In such regulators, the diaphragm closing the chamber communicating with the gas service line is thus called upon to serve as a valve controlling the main gas supply.

Since the two diaphragms were of necessity spaced slightly apart, and since the flexure of the diaphragm closing the chamber in communication with the boiler acted mechanically in flexing the other diaphragm, it has always been found necessary to place the space between the two diaphragms in communication with atmosphere, in order to permit the free movement of both diaphragms.

In such regulators, it has been the practice to use phosphor bronze diaphragms, so as to prevent contact of the water with the diaphragm causing the rusting out of the diaphragm to an extent to interfere with its accurate operation, or permit the escape of water from the boiler. It has also been the practice to make both diaphragms of the same material.

I have found in actual practice, however, that illuminating gas, largely by reason of sulphur in some form, strongly reacts with the diaphragm closing the chamber in communication with the gas line, and acts as an erodent which will ultimately have the effect of weakening this diaphragm and developing small holes therethrough, permitting gas to escape into the space between the two diaphragms and from thence into the surrounding atmosphere. While at first, this will result only in the presence of objectionable noxious fumes in the room in which the heater is located, ultimately, if the diaphragm is not replaced with a perfect diaphragm, gas is permitted to escape in volume sufficient to endanger life in the event that the room is not properly ventilated.

With the above condition in mind, I have provided a regulator in which the diaphragm closing the chamber in communication with the gas service pipe, will be so formed as to resist the action of sulphur or any acids or other substances contained in the gas, or carried thereby, so that likelihood of the development of a gas leak as a result of the erosion of the material of this diaphragm is entirely eliminated, thus permitting the use of heaters of the type above referred to without likelihood of the development of conditions injurious to, or destructive of, human life.

Furthermore, a diaphragm constructed according to my invention, may be made much thinner than the diaphragms heretofore used for controlling the flow of gas, thus permitting the use of a more sensitive diaphragm and also permitting a more effective seating of the diaphragm in its capacity as a valve, and ensuring, at all times, a more effective control of the flow of gas than is possible with diaphragms as at present constructed.

I also so construct the diaphragm as to permit greater ease in its adjustment in the regulator.

The invention consists primarily in a diaphragm pressure regulator for gas heaters embodying therein a recessed casing adapted to be placed in communication with the boiler space of a heater, a diaphragm closing the recess of said casing, a second dished casing forming a gas chamber adapted to be placed in communication with a source of gas supply and with the burners of a heater, a nipple carried thereby and extending into said chamber and having its end finished to form a valve seat, and a reduced side orifice communicating with said recess, a flexible diaphragm closing said last named recess and positioned in close proximity to the valve seat formed upon said nipple, said diaphragms being parallel in relation to each other, a spacer between said diaphragms in communication with atmosphere, and means adjacent said first named diaphragm and in engaging relation with said other diaphragm, said diaphragm co-operating with said nipple having the surface thereof presented toward said nipple coated with a metallic substance immune to the action of sulphur or other acids or substances contained in, or carried by, gas flowing through said nipple into said recess; and in such other novel features of construction and combination of parts as are hereinafter set forth and described, and more particularly pointed out in the claims hereto appended.

Referring to the drawings.

Like letters refer to like parts throughout the several views.

Figure 1:
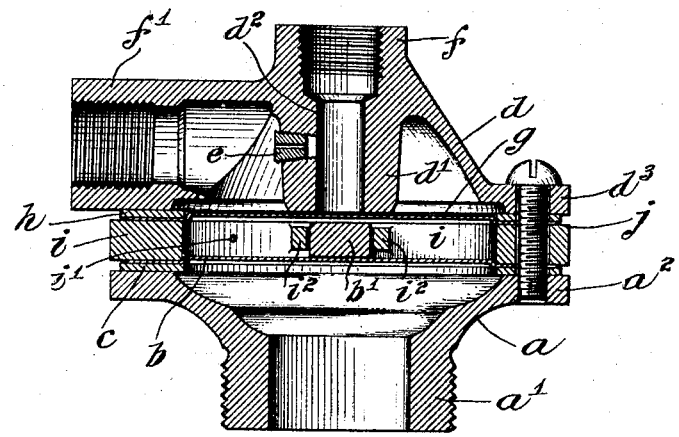
Fig. 1 is a section through a regulator embodying my invention.
Figure 2:
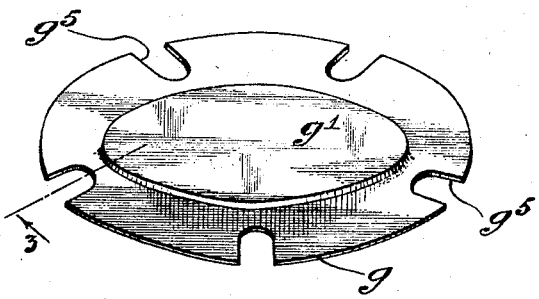
Fig. 2 is a perspective view of the gas chamber diaphragm.
Figure 3:
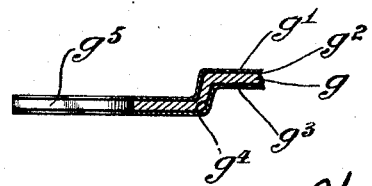
Fig. 3 is a cross-sectional view upon the line 3—3 of Fig. 2, upon a much enlarged scale.

In the embodiment of the invention shown in the drawings, $a$ is a recessed casing provided with an exteriorly screw-threaded nipple $a'$ by means of which the interior of this casing may be placed in communication with the boiler space of what is commercially known as a "gas boiler", an isolated heating unit in which the heat from a gas burner is directed against a boiler containing water, so that the heating is affected in part by means of the gas flame, but mainly by means of the heated water or steam produced by means of said flame.

Closing the recessed portion of the casing $a$ is a flexible metallic diaphragm $b$, a packing ring $c$ being interposed between this washer and the face of the flange $a^2$ of the casing $a$.

Ordinarily this diaphragm $b$ is made of phosphor-bronze or some similar material which will not be affected by water or steam.

This diaphragm $b$ acts upon a substantially, centrally positioned movable block $b'$ on the face thereof, opposite to that presented towards the casing $a$.

Associated with the casing $a$, is a recessed casing $d$ having an interior nipple $d'$ of a length to extend into close proximity to the face of the projection $b'$.

Extending through the side of the nipple $d'$ is an opening $d^2$ having mounted therein an orificed plug $e$. Extending from the casing $d$ is a screw-threaded nipple $f$ by means of which the chamber formed by the recess in this casing may be placed in communication with the gas service pipe, this communication, however, being through the open end of the nipple $d'$ or through the nozzle $e$ according to pressure conditions within the boiler. The casing $d$ is also provided with an outlet nipple $f'$ adapted to be placed in communication with the burner system of the boiler, this nipple communicating with the recess in said casing.

Closing the recess in the casing $d$ is a thin metallic diaphragm $g$ which is positioned in close proximity to, and between the projection $b'$ and the end of the nipple $d'$.

A suitable packing gasket $h$ is positioned between the edge of the diaphragm $g$ and the flange $d^3$ of the casing $d$. Interposed between the diaphragms $b$ and $g$ is a spacing ring $i$, having a vent opening or openings $i$ therethrough, so as to place the space within this ring, and between the diaphragms, in communication with atmosphere at all times, and thus limit the flexure of the diaphragm $g$ toward the nipple $d'$ to its mechanical displacement as a result of the projection $b'$ thereof. The two casings $a$ and $d$, the diaphragms $b$ and $g$, the gaskets $c$ and $h$ and the spacing ring $i$ are secured together by means of the screws $j$. The ring $i$ is provided with a recessed bar $i^2$ having a pocket movably supporting the block $b'$ between the diaphragms $b$ and $g$.

In a diaphragm regulator as heretofore described one side of the diaphragm $b$ is exposed to water or steam only, and the other side thereof is exposed to atmospheric air and one side of the diaphragm $g$ is exposed to atmospheric air, that side presented toward the diaphragm $b$, and the other side thereof is exposed to the action of illuminating gas.

As a result of this condition, deterioration of the diaphragm $g$ has always been fairly rapid when phosphor-bronze was used for this diaphragm, since certain constituents of the gas have an erosive action upon bronze which will ultimately make portions of this diaphragm porous to an extent to permit gas to escape from the recess within the casing $d$ to the space within the spacing ring $i$ and from thence to within the room being heated by the gas boiler. While a thickened diaphragm will increase the time interval before gas can escape through the diaphragm, the increase in thickness of the diaphragm will decrease its flexibility and make a tight seating of the diaphragm against the end face of the nipple $d'$ difficult, thus decreasing the sensitiveness of the regulator. Any expedient which will thus decrease the flexibility of the diaphragm $g$ is undesirable in a regulator of this type.

In order to permit the use of a thin metal diaphragm $g$, and at the same time prevent the erosive action of the gas thereon, I form this diaphragm of a core of thin metal, and provide a surface $g'$ thereon presented toward the recess in the casing $d$, which is immune to the action of sulphur or other acids or substances contained in, or carried by, gas flowing through the nipple $d'$ and the recess within the casing $d$. This surface $g'$ is preferably formed of electrolytically deposited gold of a purity of at least 22 karats. A surface so formed has the advantage not only of being firmly anchored to the core, but also of not materially increasing the thickness of the diaphragm, while at the same time completely covering the entire surface thereof without likelihood of the presence of even pin holes through which the metal of the core, or of a metallic stratum intermediate the gold surface and the core, is exposed to the action of the gas.

The intermediate stratum, which in the drawings is indicated at $g^2$, above referred to, consists of a thin surface of nickel electro-plate applied to the diaphragm before it is electro-plated with gold, this nickel-plate being used when the core is made of bronze, for the purpose of securing a more permanent cohesion of the gold to the core than can be secured by gold-plating directly upon bronze.

By using a surface $g'$ as described, with or without the intermediate stratum $g^2$, not only is there no diminishing in the flexibility of the diaphragm, but it is possible to use a thinner diaphragm possessing greater flexibility than the diaphragms heretofore used, since erosion by the gas need not be considered in determining the thickness of the diaphragm, and the only thing which need be considered is, to secure a thickness which will give the desired degree of flexibility to the diaphragm.

As an additional safeguard in a diaphragm embodying the characteristics above referred to, I preferably provide the face of the core of this diaphragm $g$ presented toward the ring $i$ with a surface coating $g^3$ similar to the surface $g'$, and an intermediate stratum $g^4$ similar to the stratum $g^2$. In this manner in the event that there should be any flaw in the surface $g'$ permitting erosive action by the gas upon the core of this diaphragm $g$, the surface $g^3$ will resist the action of the gas at the surface most remote from the casing $d$, and thus prevent its escape to within the ring $i$ and through the vent $i'$ into a room.

I also preferably provide slots $g^5$ about the edge of the diaphragm instead of holes, since I have found that this construction facilitates the assembling of the regulator.

By providing a regulator having the diaphragm $g$ constructed as herein described, one of the most serious objections to the use of so-called gas boilers is obviated, since the escape of gas as a result of deterioration of the diaphragm $g$ has heretofore been a serious problem, particularly as regulators must be used with such heating units, and such boilers are used by people who lack sufficient knowledge of the mechanics of the boilers to properly care for the regulator.

Heretofore various mechanisms have been employed for controlling the flow of gas in a manner which will prevent gas coming in contact with the diaphragms, but such mechanisms have not been found satisfactory in use.

It is not my intention to limit the invention to the use in the regulator, of a diaphragm having the exact configuration of that shown, since the use of a dished diaphragm is not essential.

Having described the invention, what I claim as new and desire to have protected by Letters Patent, is:—

1. A diaphragm pressure regulator for gas heaters embodying therein a recessed casing adapted to be placed in communication with the boiler space of a heater, a diaphragm closing the recess of said casing, a second dished casing forming a gas chamber adapted to be placed in communication with a source of gas supply and with the burners of a heater, a nipple carried thereby and extending into said chamber and having its end finished to form a valve seat, and a reduced side orifice communicating with said recess, a flexible diaphragm closing said last named recess and positioned in close proximity to the valve seat formed upon said nipple, said diaphragms being parallel in relation to each other, a spacer between said diaphragms in communication with atmosphere, and means adjacent said first named diaphragm and in engaging relation with said other diaphragm, said diaphragm co-operating with said nipple having the surface thereof presented toward said nipple coated with a metallic substance immune to the action of sulphur or other acids or substances contained in, or carried by, gas flowing through said nipple into said recess.

2. A diaphragm pressure regulator for gas heaters embodying therein a recessed casing adapted to be placed in communication with the boiler space of a heater, a diaphragm closing the recess of said casing, a second dished casing forming a gas chamber adapted to be placed in communication with a source of gas supply and with the burners of a heater, a nipple carried thereby and extending into said chamber and having its end finished to form a valve seat, and a reduced side orifice communicating with said recess, a flexible diaphragm closing said last named recess and positioned in close proximity to the valve seat formed upon said nipple, said diaphragms being parallel in relation to each other, a spacer between said diaphragms in communication with atmosphere, and means adjacent said first named diaphragm and in engaging relation with said other diaphragm, said diaphragm co-operating with said nipple having its opposite faces formed of a metallic substance immune to the action of sulphur, or other acids or substances contained in, or carried by, gas flowing through said nipple into said recess.

3. A diaphragm pressure regulator for gas heaters embodying therein a recessed casing adapted to be placed in communication with the bolier space of a heater, a diaphragm closing the recess of said casing, a second dished casing forming a gas chamber adapted to be placed in communication with a source of gas supply and with the burners of a heater, a nipple carried thereby and extending into said chamber and having its end finished to form a valve seat, and a reduced side orifice communicating with said recess, a flexible diaphragm closing said last named recess and positioned in close proximity to the valve seat formed upon said nipple, said diaphragms being parallel in relation to each other, a spacer between said diaphragms in communication with atmosphere, and means adjacent said first named diaphragm and in engaging relation with said other diaphragm, said diaphragm co-operating with said nipple having the surface thereof presented toward said nipple formed of an electrodeposition of gold, whereby sulphur, or other acids or substances contained in, or carried by, gas flowing through said nipple into said recess, will have no erosive action upon said diaphragm.

4. A diaphragm pressure regulator for gas heaters embodying therein a recessed casing adapted to be placed in communication with the boiler space of a heater, a diaphragm closing the recess of said casing, a second dished casing forming a gas chamber adapted to be placed in communication with a source of gas supply and with the burners of a heater, a nipple carried thereby and extending into said chamber and having its end finished to form a valve seat, and a reduced side orifice communicating with said recess, a flexible diaphragm closing said last named recess and positioned in close proximity to the valve seat formed upon said nipple, said diaphragms being parallel in relation to each other, a spacer between said diaphragms in communication with atmosphere, and means adjacent said first named diaphragm and in engaging relation with said other diaphragm, said diaphragm co-operating with said nipple having both surfaces thereof formed of an electrodeposition of gold, whereby sulphur, or other acids or substances contained in, or carried by, gas flowing through said nipple into said recess, will have no erosive action upon said diaphragm, and in the event of imperfections in the surface of said diaphragm presented toward said nipple, the opposite surface will prevent sufficient erosion to permit gas to pass completely through the diaphragm.

5. A diaphragm pressure regulator for gas heaters embodying therein a recessed casing adapted to be placed in communication with the boiler space of a heater, a diaphragm closing the recess of said casing, a second dished casing forming a gas chamber adapted to be placed in communication with a source of gas supply and with the burners of a heater, a nipple carried thereby and extending into said chamber and having its end finished to form a valve seat, and a reduced side orifice communicating with said recess, a flexible diaphragm closing said last named recess and positioned in close proximity to the valve seat formed upon said nipple, said diaphragms being parallel in relation to each other, a spacer between said diaphragms in communication with atmosphere, and means adjacent said first named diaphragm and in engaging relation with said other diaphragm, said diaphragm co-operating with said nipple consisting of a bronze core having the surface thereof presented toward said nipple formed of an electrodeposition of gold, and a stratum of an electrodeposition of nickel between said gold and said core, whereby sulphur, or other acids or substances contained in, or carried by, gas flowing through said nipple into said recess, will have no erosive action upon said diaphragm.

6. A diaphragm pressure regulator for gas heaters embodying therein a recessed casing adapted to be placed in communication with the boiler space of a heater, a diaphragm closing the recess of said casing, a second dished casing forming a gas chamber adapted to be placed in communication with a source of gas supply and with the burners of a heater, a nipple carried thereby and extending into said chamber and having its end finished to form a valve seat, and a reduced side orifice communicating with said recess, a flexible diaphragm closing said last named recess and positioned in close proximity to the valve seat formed upon said nipple, said diaphragms being parallel in relation to each other, a spacer between said diaphragms in communication with atmosphere, and means adjacent said first named diaphragm and in engaging relation with said other diaphragm, said diaphragm co-operating with said nipple consisting of a bronze core having its opposite surfaces formed of an electrodeposition of gold, and a stratum of an electrodeposition of nickel between said gold and said core, whereby sulphur, or other acids or substances contained in, or carried by, gas flowing through said nipple into said recess, will have no erosive action upon said diaphragm, and in the event of imperfections in the surface of said diaphragm presented toward said nipple, the opposite surface will prevent sufficient erosion to permit gas to pass completely through the diaphragm.

7. A diaphragm pressure regulator for gas heaters embodying therein a recessed casing adapted to be placed in communication with the boiler space of a heater, a diaphragm closing the recess of said casing, a second dished casing forming a gas chamber adapted to be placed in communication with a source of gas supply and with the burners of a heater, a nipple carried thereby and extending into said chamber and having its end finished to form a valve seat, and a reduced side orifice communicating with said recess, a flexible diaphragm closing said last named recess and positioned in close proximity to the valve seat formed upon said nipple, said diaphragms being parallel in relation to each other, a spacer between said diaphragms in communication with atmosphere, and means adjacent said first named diaphragm and in engaging relation with said other diaphragm, said diaphragm co-operating with said nipple having its opposite faces formed of a metallic substance immune to the action of sulphur, or other acids or substances contained in, or carried by, gas flowing through said nipple into said recess, and having a plurality of notches about the perimeter thereof whereby the mounting of the diaphragm with relation to the other parts of the regulator, is facilitated.

In witness whereof I have hereunto affied my signature, this 24th day of January, 1924.

AARON H. WOLFF.